United States Patent [19]
Lang et al.

[11] Patent Number: 5,950,759
[45] Date of Patent: Sep. 14, 1999

[54] SERVO-ASSISTED STEERING SYSTEM

[75] Inventors: Armin Lang, Schwabisch Gmund; Helmut Knodler, Lorch, both of Germany

[73] Assignee: ZF Friedrichshafen, Friedrichshafen, Germany

[21] Appl. No.: 08/564,041

[22] PCT Filed: Jun. 14, 1994

[86] PCT No.: PCT/EP94/01931

§ 371 Date: Mar. 12, 1996

§ 102(e) Date: Mar. 12, 1996

[87] PCT Pub. No.: WO94/29158

PCT Pub. Date: Dec. 22, 1994

[30] Foreign Application Priority Data

Jun. 16, 1993 [DE] Germany .............................. 43 19 891

[51] Int. Cl.$^6$ ...................................................... B62D 5/22
[52] U.S. Cl. ........................................... 180/441; 180/421
[58] Field of Search ..................... 180/417, 421, 180/428, 441, 442; 137/627.5

[56] References Cited

U.S. PATENT DOCUMENTS

| | | | |
|---|---|---|---|
| 4,607,717 | 8/1986 | Nakayama | 180/428 X |
| 5,509,493 | 4/1996 | Lang et al. | 180/417 |
| 5,529,137 | 6/1996 | Lang | 180/417 |
| 5,590,566 | 1/1997 | Joerg et al. | 180/428 X |

Primary Examiner—Brian L. Johnson
Assistant Examiner—Avraham Lerner
Attorney, Agent, or Firm—Larson & Taylor

[57] ABSTRACT

In a servo-assisted steering system which is intended for motor vehicles, a steering valve (1) is provided for controlling the pressure fluid. The steering valve (1) has two intake seat valves (7, 8) and two outlet seat valves (10, 11), which are adjustable via an actuating device (23) as a function of a rotary motion of a steering shaft. In the neutral position of the steering valve (1), the outlet seat valves (10, 11) are closed. The intake seat valves (7, 8) can be acted upon in the closing direction by the force of compression springs (13) and are not opened until after the closure of the respective associated outlet seat valve (10, 11). One limiting piston (24) is provided for each side of the steering valve (1). Each limiting piston (24) is acted upon on one side by the pressure prevailing in the work chamber (3, 4) of a servomotor (5) and on the other by a limiting spring (25), which in the neutral position of the steering valve (1) keeps the limiting piston (24) at a distance from the closure body (12) of the intake seat valve (8). If the force of the pressure acting upon the limiting piston (24) exceeds the force of the limiting spring (25), the limiting piston (24) is applied to the closure body (12) of the intake seat valve (8) and acts upon it. With such an arrangement a "cutoff or actuating moment limitation" is attained.

3 Claims, 1 Drawing Sheet

SERVO-ASSISTED STEERING SYSTEM

BACKGROUND OF THE INVENTION

1. Field of the Invention

The invention relates to a servo-assisted steering system for motor vehicles The servo-assisted steering system includes a steering valve that has two intake seat valves and two outlet seat valves, which can be adjusted via an actuating device as a function of a rotary motion of a steering shaft. The closure bodies of the outlet seat valves can be acted upon via their actuating tappets by the force of centering springs in the direction toward the actuating device, so that the actuating tappets contact the actuating device. The closure bodies of the intake seat valves can be acted upon in the closing direction by the force of compression springs, so that the intake seat valves are closed in the neutral position of the steering valve. The outlet seat valves are open in the neutral position of the seat valve. The intake seat valves are not opened until after the closure of the respective associated outlet seat valves.

2. Description of the Prior Art

This kind of servo-assisted steering system with a closed center is known from German Patent Disclosure DE-A1 41 26 020. Such a servo-assisted steering system has a linear characteristic curve course. This means that at high servo-pressures, the actuating moment can rise sharply.

In modern servo-assisted steering systems with an open center, however, it is usual for the actuating moment to be increased only insignificantly beyond a certain pressure in the servomotor. This means that beyond this certain point, the characteristic curve has a steeper course. This effect is known as "cutoff" or "actuating moment limitation".

The object of the invention is to improve a servo-assisted steering system of this generic type, that is, a servo-assisted steering system having a closed center, in such a way that with its steering valve, characteristic curves can be generated that in their form come as close as possible to the characteristic curves of conventional modern servo-assisted steering systems with an open center.

SUMMARY OF THE INVENTION

This object is attained by the servo-assisted steering system of the present invention. It is attained in particular in that in a generic servo-assisted steering system, one limiting piston is provided for each side of the steering valve, and the limiting piston is acted upon on one side by the pressure prevailing in a work chamber of a servomotor and on the other by a limiting spring. The limiting spring, in the neutral position of the steering valve, keeps the limiting piston at a distance from the closure body of the intake seat valve. As a result, beyond a certain servo-pressure, the mechanical centering forces of the steering valve are reduced. The limiting piston then acts upon the closure body of the intake seat valve, if the force of the pressure acting on the limiting piston exceeds the force of the limiting spring. An essential feature here is that the limiting piston acts on the closure body of the intake seat valve, and not on the closure body of the outlet seat valve. As a result, on steering back to a previous position, a valve characteristic curve is produced in accordance with which on a drop in the pressure in the servomotor, the actuating moment at the steering wheel decreases gradually.

The function of the limiting piston is improved by making the cross section of the limiting piston smaller than the cross section of the closure body of the intake seat valve.

Expedient and advantageous features of the invention are described herein. However, the invention is not limited to the combination of characteristics of the claims. For one skilled in the art, additional logical possibilities for combining claims and individual claim characteristics will become apparent from the stated object.

In a preferred embodiment, the limiting piston is kept in contact with a stop shoulder of a valve housing by the limiting spring, in the neutral position of the steering valve. As a result, the pressure at which the limiting piston begins to move can be defined precisely. In addition, the limiting piston is stabilized in the neutral position, thus preventing any possible "flutter" of the limiting piston.

An embodiment that is structurally especially simple and favorable is obtained if each limiting piston, on its face end toward the closure body of the intake seat valve, has axially oriented extensions with which a contact with this closure body can be made.

The invention will be described in further detail below in terms of an exemplary embodiment shown in the drawing.

DETAILED DESCRIPTION OF THE PREFERRED EMBODIMENTS

Figure 1:
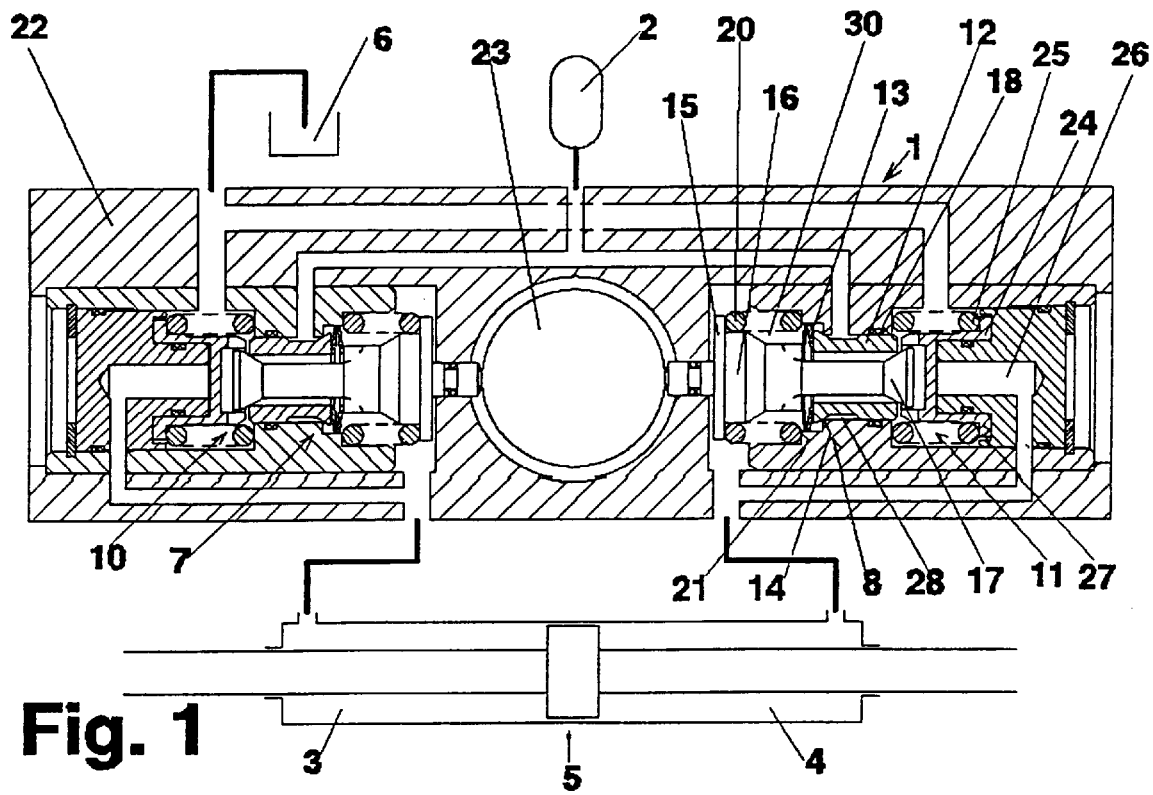
FIG. 1, is a longitudinal section through the steering valve of the servo-assisted steering system of the invention, with steering assemblies shown schematically.

The servo-assisted steering system of the invention includes a steering valve 1. The steering valve 1 controls the pressure fluid, which is pumped to and from the work chambers 3 and 4 of a servomotor 5 and back to a reservoir 6 by a servo pump, not shown, and is expediently stored in a accumulation 2. The steering valve 1 includes two intake seat valves 7 and 8 and two outlet seat valves 10 and 11. The intake seat valve 7 and 8 and the outlet seat valve 10 and 11, respectively, are disposed coaxially with one another.

The two parts of the steering valve 1, each with one intake seat valve 7 and 8 and one outlet seat valve 10 and 11, respectively, are embodied substantially identically. The more-detailed structure of the steering valve 1 will therefore be described below in terms of only one part—the right-hand part in FIG. 1—of the steering valve 1, that is, the part having the intake seat valve 8 and the outlet seat valve 11.

In the neutral position of the steering valve 1, the intake seat valve 8 is closed. This is accomplished because its closure body 12 can be acted upon by the force of a compression spring 13, in the form of cup springs, in the closing direction toward a valve seat 14 structurally connected to the housing. The compression spring 13 is supported on one end on the closure body 12 and on the other on a shoulder of an actuating tappet 16. A closure body 17 of the outlet seat valve 11 is formed on the actuating tappet 16 and cooperates with a valve seat 18 disposed on the closure body 12.

The actuating tappet 16 is kept in contact with an actuating device 23 by the force of a centering spring 20, which is supported on one end on a collar 15 of the actuating tappet 16 and on the other on a shoulder 21 of a valve housing 22. The actuating device 23 can be moved as a function of a rotary motion of a steering shaft, not shown. The actuating device 23 is for instance in driving communication with a pinion, not shown, of a rack and pinion steering system.

In addition to an intake seat valve 8 and the outlet seat valve 11, a limiting piston 24 is provided. The limiting piston 24 is acted upon on one side, the side toward the intake seat valve 8 and the outlet seat valve 11, by a limiting spring 25. On its other side, the limiting piston 24 is acted upon by a pressure that prevails in an adjacent limiting chamber 26. The limiting chamber 26 communicates with the work chamber 4 of the servomotor 5, so that the same pressure as in the work chamber 4 prevails in the limiting chamber 26. In the neutral position of the steering valve, the force of the limiting spring 25 is greater than the force of the pressure prevailing in the limiting chamber 26. This keeps the limiting piston 24, in the neutral position of the steering valve 1, in contact with a stop shoulder 27 of the valve housing 22. In the neutral position of the steering valve, there is a distance between the limiting piston 24 and the closure body 12 of the intake seat valve that is not spanned until the limiting piston 24 is displaced toward the closure body 12 by the pressure prevailing in the limiting chamber 26, counter to the force of the limiting spring 25. The effective cross section of the limiting piston 24, which is acted upon by the pressure prevailing in the limiting chamber 26, is less than the effective cross section of the closure body 12 of the intake seat valve 8.

The accumulator 2 communicates via suitable conduits with an inflow chamber 28, which is disposed at the intake seat valve 8. A chamber 30 that contains the centering spring 20 and that in the neutral position of the steering valve 1 is disconnected from the inflow chamber 28 communicates with the work chamber 4 of the servomotor 5, and so the same pressure as in the limiting chamber 26 prevails in the chamber 30. The chamber 30 also communicates with the pressure fluid tank 6, via the outlet seat valve 11, which is open in the neutral position of the steering valve 1, and corresponding conduits.

The function of the servo-assisted steering system according to the invention will now be described: If the actuating device 23 is moved for instance to the left, by a rotation of the steering hand wheel, not shown, then first the outlet seat valve 11 closes. The closure body 17 of the outlet seat valve 11, in its further motion, carries the closure body 12 of the intake seat valve 8 with it, so that that valve opens. The pressurized pressure fluid flows out of the inflow chamber 28 into the chamber 30 and thus into both the work chamber 4 and the limiting chamber 26. The pressure prevailing in the chamber 30 acts as reaction pressure upon the closure body 12 of the intake seat valve 8 and thus acts counter to the actuating force of the actuating device 23. This pressure prevails simultaneously in the limiting chamber 26 and presses the limiting piston 24 counter to the force of the limiting spring 25, to the left in FIG. 1. If this pressure force exceeds the prestressing force of the limiting spring 25, then the limiting piston 24 moves to the left and presses against the closure body 12 of the intake seat valve 8. As a result, the effective cross section at the closure body 12 is decreased by the cross section of the limiting piston 24, and the reaction force decreases accordingly.

If the pressure in the work chamber 4 and thus in the chamber 30 rises far enough that the force on the closure body 12, minus the force on the limiting piston 24, exceeds the prestressing force of the centering spring 20, then the actuating tappet 16 lifts away from the actuating device 23. After that, no further increase in pressure occurs.

If subsequently the force at the actuating device 23 decreases, then the pressure in the work chamber 4 remains trapped until such time as the hydraulic force at the closure body 17 of the outlet seat valve 11 overcomes the mechanical closing force and opens the outlet seat valve 11.

Figure 2:
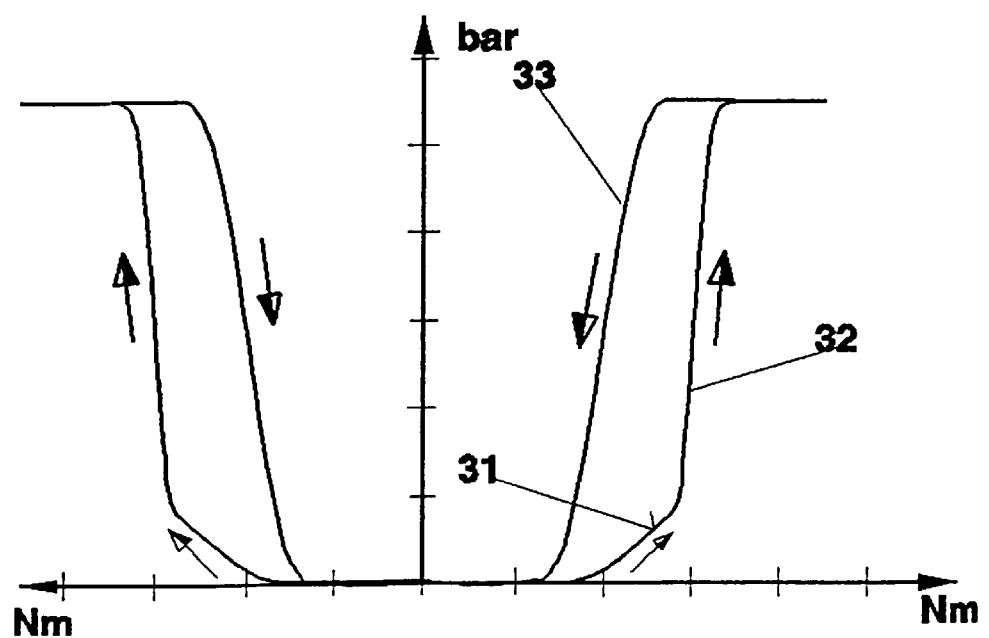
FIG. 2, is a valve characteristic curve of the servo-assisted steering system of the invention.

The result is a valve characteristic curve as shown in FIG. 2. A first section 31 of the curve representing when the steering wheel is deflected for turning or cornering corresponds to the cross section of the closure body 12 of the intake seat valve 8. A second steering wheel deflection section 32 of the curve corresponds to the difference between the cross section of the closure body 12 of the intake seat valve 8 and the cross section of the limiting piston 24. A third section 33 of the curve representing when the steering wheel is returned to a straight-ahead position corresponds to the cross section of the closure body 17 of the outlet seat valve 11. The effective cross section of the actuating tappet 16 remains unaffected.

We claim:

1. A servo-assisted steering system for motor vehicles, having a steering valve having first and second sides, which has two intake seat valves and two outlet seat valves provided with closure bodies and actuating tappets, which are adjustable via an actuating device as a function of a rotary motion of a steering shaft, wherein the closure bodies of the outlet seat valves and their actuating tappets are acted upon by the force of centering springs in the direction of the actuating device, so that the actuating tappets rest on the actuating device;

wherein the closure bodies of the intake seat valves can be acted upon by the forces of compression springs in a closing direction and are thereby closed in a neutral position of the steering valve;

wherein the outlet seat valves are open in the neutral position of the steering valve; and wherein the intake seat valves are not opened until after the closure of the respective associated outlet seat valve, the improvement comprising:

for each side of the steering valve, one limiting piston is provided;

that each limiting piston is acted upon on one side by the pressure prevailing in a work chamber of a servomotor and on the other side by a limiting spring, which in the neutral position of the steering valve keeps the limiting piston spaced apart from the closure body of the intake seat valve;

that the limiting piston is applied to the closure body of the intake seat valve and acts upon the closure body whenever the force of the pressure acting on a first side of a limiting piston exceeds the force of the limiting spring; and that the cross section of the limiting piston is smaller than the effective cross section of the closure body of the intake seat valve.

2. The servo-assisted steering system of claim 1, wherein each limiting piston has a second side which is acted upon by a second limiting spring, which in the neutral position of the steering valve presses the limiting piston against a stop shoulder of a valve housing receiving the steering valve.

3. The servo-assisted steering system of claim 1, wherein each limiting piston, on a face end which faces toward the closure body of the intake seat valve, has axially oriented extensions, with which contact with the closure body is made.

\* \* \* \* \*